United States Patent [19]
Ikeda et al.

[11] Patent Number: 5,585,945
[45] Date of Patent: Dec. 17, 1996

[54] IMAGE SYNTHESIS WITH REDUCED MEMORY REQUIREMENTS

[75] Inventors: Yoshinori Ikeda, Tokyo; Koichi Katoh, Yokohama; Masanori Sakai, Yokohama, all of Japan

[73] Assignee: Canon Kabushiki Kaisha, Tokyo, Japan

[21] Appl. No.: 22,435

[22] Filed: Feb. 16, 1993

Related U.S. Application Data

[63] Continuation of Ser. No. 627,882, Dec. 13, 1990, abandoned, which is a continuation of Ser. No. 363,861, Jun. 9, 1989, Pat. No. 4,999,920.

[30] Foreign Application Priority Data

Jun. 13, 1988 [JP] Japan .................................. 63-144929
Oct. 7, 1988 [JP] Japan .................................. 63-254205

[51] Int. Cl.⁶ .................................................. H04N 1/387
[52] U.S. Cl. ..................... 358/540; 358/450; 358/537
[58] Field of Search ........................... 358/75, 78, 80, 358/183, 408, 409, 452, 453, 537, 538, 540, 450; 382/41, 44, 48, 56, 162, 167, 284; 348/586, 589, 600; 395/135; H04N 1/387, 1/46

[56] References Cited

U.S. PATENT DOCUMENTS

| | | | |
|---|---|---|---|
| 4,236,813 | 12/1980 | Levine | 358/75 |
| 4,417,805 | 11/1983 | Kishi | 355/14 R |
| 4,731,672 | 3/1988 | Sugishima et al. | 358/296 |
| 4,750,212 | 6/1988 | Yokimizo | 358/183 |
| 4,896,208 | 1/1990 | Moriya et al. | 358/75 |
| 4,905,079 | 2/1990 | Hayashi | 358/78 |
| 4,956,704 | 9/1990 | Yamada | 358/80 |
| 5,028,993 | 7/1991 | Kobori et al. | 358/540 |
| 5,032,928 | 7/1991 | Sakai et al. | 358/453 |
| 5,034,806 | 7/1991 | Ikeda et al. | 358/80 |
| 5,055,941 | 10/1991 | Suzuki et al. | 358/80 |
| 5,289,270 | 2/1994 | Hayashi | 358/512 |

FOREIGN PATENT DOCUMENTS

| | | | |
|---|---|---|---|
| 53-117320 | 10/1978 | Japan | 358/408 |
| 0125768 | 9/1980 | Japan | |
| 0171859 | 9/1985 | Japan | |

*Primary Examiner*—Kim Yen Vu
*Attorney, Agent, or Firm*—Fitzpatrick, Cella, Harper & Scinto

[57] ABSTRACT

There is provided an image processing system in which when two images are synthesized, a first image is transmitted from a first image processing section to a second image processing section and a third image is obtained by synthesizing the first and second images, wherein the system has means for adding image effective area information for synthesization and for transmitting simultaneously with the first image information, and the image synthesization is executed on the basis of the image effective area information.

18 Claims, 12 Drawing Sheets

(A)

(B)

(C)

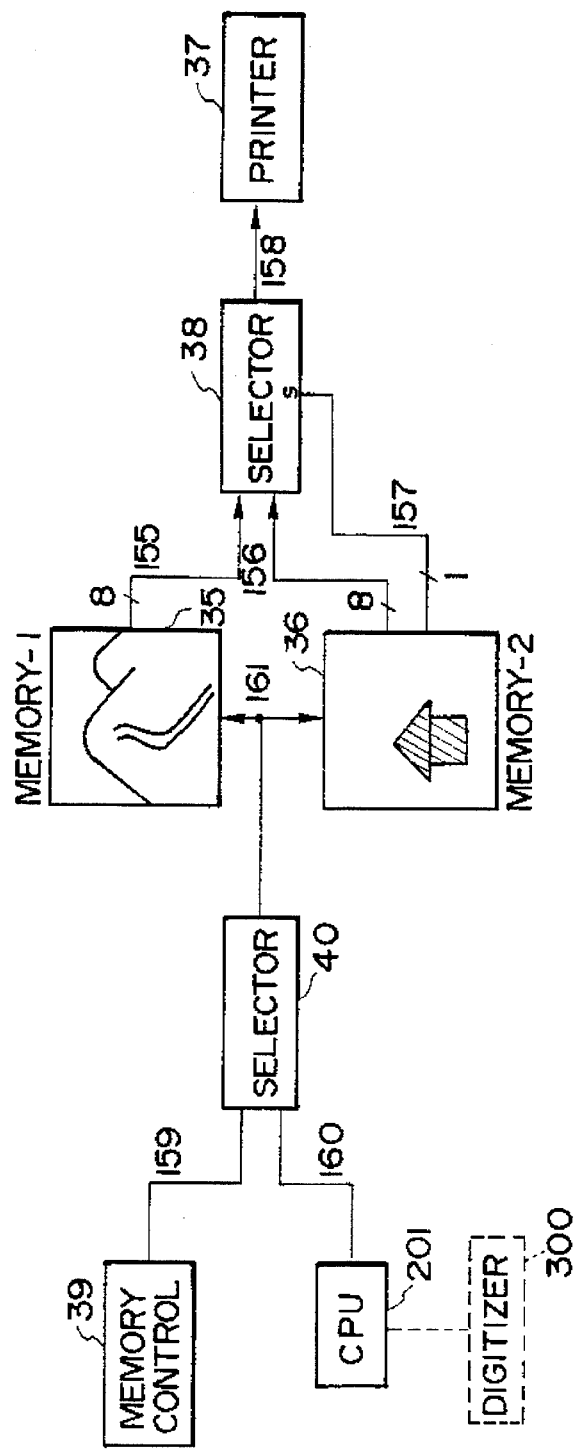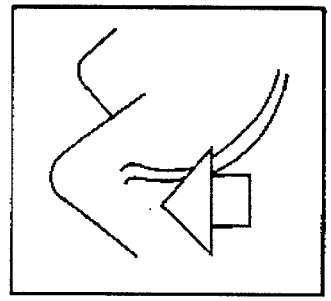
FIG. 9
FIG. 10

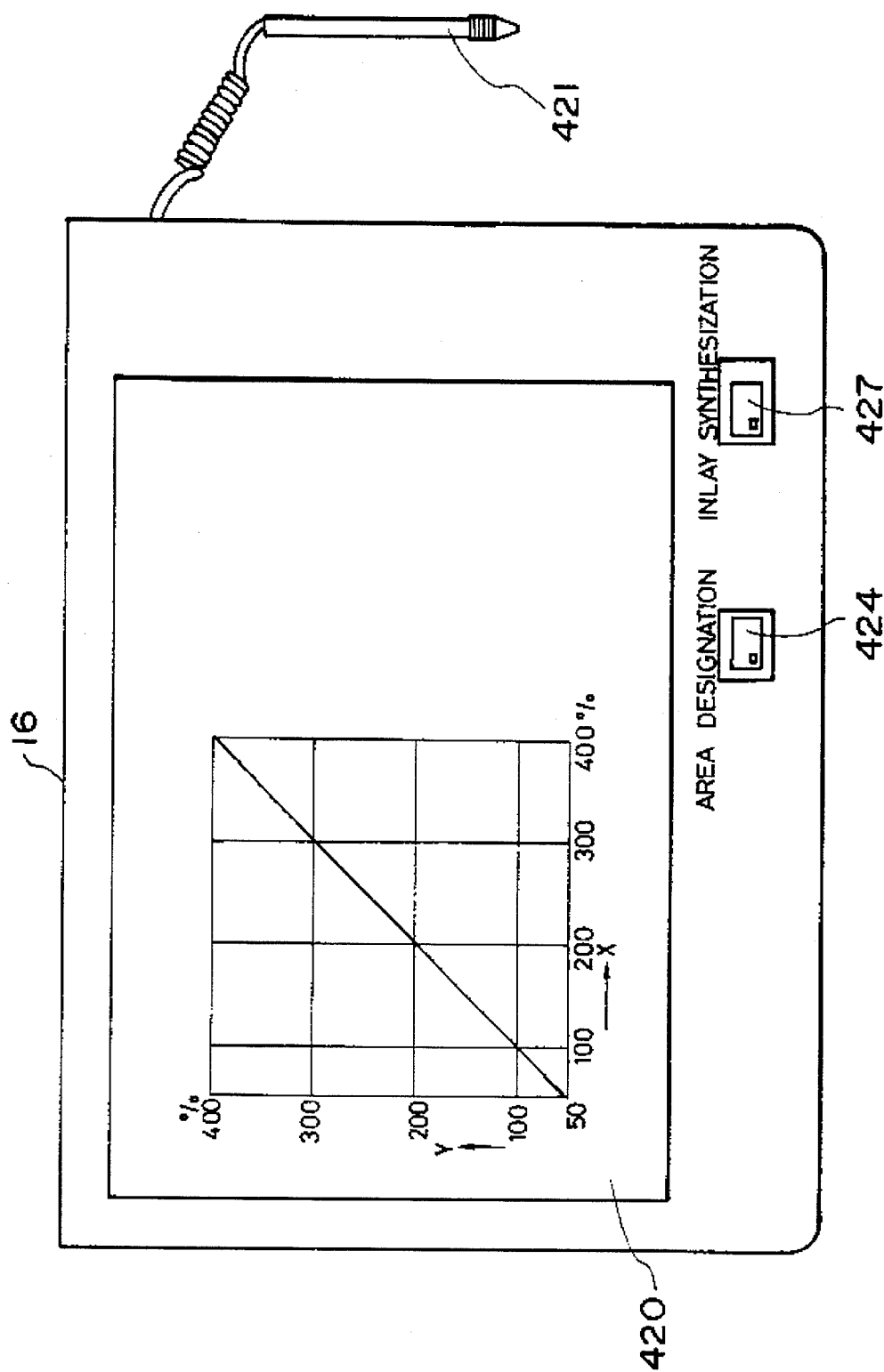

IMAGE SYNTHESIS WITH REDUCED MEMORY REQUIREMENTS

This application is a continuation of application Ser. No. 07/627,882, filed Dec. 13. 1990, now abandoned which was a continuation of application Ser. No. 07/363,861, filed Jun. 9, 1989, now 4,999,920.

BACKGROUND OF THE INVENTION

1. Field of the Invention

The present invention relates to an image processing system and, more particularly, to image synthesis for obtaining a synthesized image by synthesizing two or more images.

2. Related Background Art

In recent years, an image input/output apparatus for digitally reading an image and for digitally processing the image and outputting the result has become widespread. Since such an image input/output apparatus handles digital data, there is an advantage that the data can be relatively easily processed and edited. On the other hand, as various kinds of image input/output apparatuses are widespread, a demand for being able to connect two or more kinds of apparatuses and to synthesize different images is increasing more and more.

For instance, as shown in FIG. 2, there is a case where a synthesized copy as shown in (C) is obtained from color images of (A) and (B), or the like. In such a case, for instance, as shown in FIG. 4, the image (A) is input from a scanner S and stored in a memory 1 ($M_1$) and, thereafter, an image (B) is input from the scanner S and stored in a memory 2 ($M_2$). Thereafter, the images are properly read out of the memories $M_1$ and $M_2$ and synthesized. The resultant synthesized image is stored in a synthesized image memory $M_3$ and the synthesized image as shown in (C) is output to an output apparatus 0. There is also a case where the memory $M_3$ also serves as memory $M_1$ or $M_1$.

Since the above system has been constructed as mentioned above, in the case where an original of the A4 size is read by the scanner S for every color component at a high density of, e.g., 400 dpi, the memory capacity which is necessary for synthesis may reach 48 megabytes. On the other hand, in the case of reading an original of the A3 size for four colors, memory capacity of 128 megabytes is needed. In the case of a DRAM of 1 megabit capacity, a large number of drams, for instance 1024 (=128×8) DRAMs, are needed. Therefore, there are problems that the hardware scale is extremely large and that the system cost rises due to an increase in cost of the memories.

Further, according to such a system, not only are memories of a large capacity needed but also there are problems that it is necessary to access a large amount of image data for synthesis and it is difficult to synthesize the image data at a high speed.

On the other hand, according to the conventional system, since the synthesis is realized by properly switching two first and second inputs mentioned above, the operator needs to previously input to a processing system the location of an image area to be synthesized from the scanner or it is necessary to input image data from the scanner and to send the image data to the processing system. Communicating means or a procedure on the software for this purpose is needed. On the other hand, particularly, in the case where the image data from the scanner is trimmed (partially extracted) and synthesized with the image in the memory, the trimming areas and sizes are variably set by the operators. Thus, it is troublesome to execute the above procedure each time the images are synthesized.

SUMMARY OF THE INVENTION

It is an object of the present invention to provide an image processing system which can solve the foregoing problems.

Another object of the invention is to provide an image processing system which can easily and simply synthesize a plurality of images.

Under such objects, according to a preferred embodiment of the invention, there is disclosed an image processing system in which a first image is sent from a first image processing section to a second image processing section and a third image is obtained by synthesizing the first image and second image, wherein the system has means for adding image effective area information for synthesis and for sending such information simultaneously with the first image data.

Still another object of the invention is to provide an image processing system which can easily synthesize two color images at a high speed.

Under the above object, it is another object of the invention to provide an image processing system which can synthesize a plurality of image signals from a plurality of color image reading apparatuses for area-sequentially reading color images.

Still another object of the invention is to provide an image processing system which can easily synthesize image signals from two image reading apparatuses at a high speed.

Under the above object, it is still another object of the invention to provide a novel color image processing system suitable for synthesization of color images.

The above and other objects and features of the present invention will become apparent from the following detailed description of the preferred embodiments, taken with reference to the accompanying drawings.

BRIEF DESCRIPTION OF THE DRAWINGS

FIG. 9 is a block diagram showing a construction of the second embodiment of the invention;

FIG. 10 is a diagram showing an image synthesized by the system shown in FIG. 9;

FIG. 17 is a plan view of digitizer 300 shown in FIGS. 9 and 13.

DETAILED DESCRIPTION OF THE PREFERRED EMBODIMENTS

Figure 3:
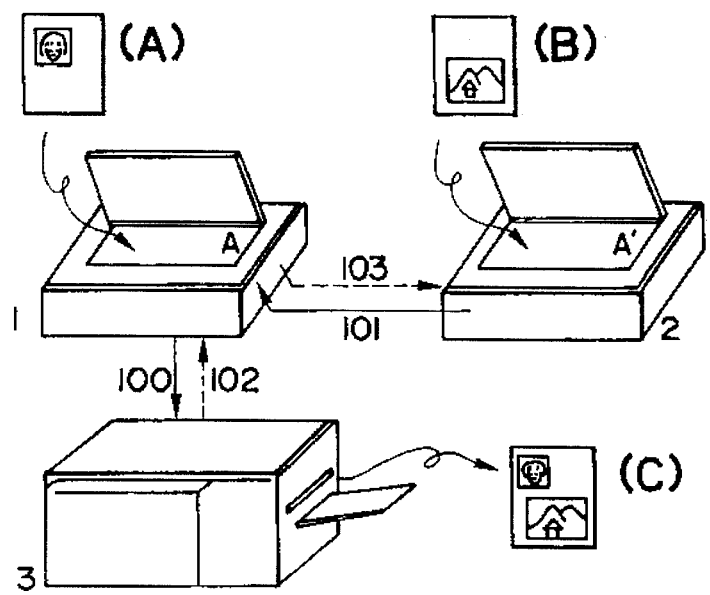
FIG. 3 is a diagram showing the overall construction of the first embodiment of the invention.

An embodiment of the present invention will be described hereinbelow with reference to FIG. 3 and subsequent drawings. FIG. 3 is a block diagram showing connections in a system in this embodiment of the invention. Reference numerals 1 and 2 denote color scanners and 3 indicates a color printer such as a color laser beam printer which sends a synchronization signal (or sync signal) 102 for the image output to the scanner 1. On the basis of the sync signal 102, the scanner 1 reads a color original (A) and transmits a sync signal 103 which is the same as or is synchronized with the sync signal 102 to the scanner 2. The scanner 2 reads a color original (B) synchronously with the sync signal 103 and sends image data 101 to the scanner 1. Then, the scanner 1 synthesizes both images (A) and (B) and transmits a synthesized image signal to the color printer 3, so that a synthesized copy (C) is obtained. In this embodiment, the image is input from the scanner 2 to the scanner 1 and is synthesized by the scanner 1 with the image which was generated or read in the scanner 1 and, thereafter, the synthesized image signal is output to the printer 3. However, as shown below, it is also possible to connect those components in a manner such that the printer 3 is connected to the scanner 2, the image is input from the scanner 1 to the scanner 2, and both images are synthesized in the scanner 2 and the synthesized image signal is output to the printer 3.

Figure 1:
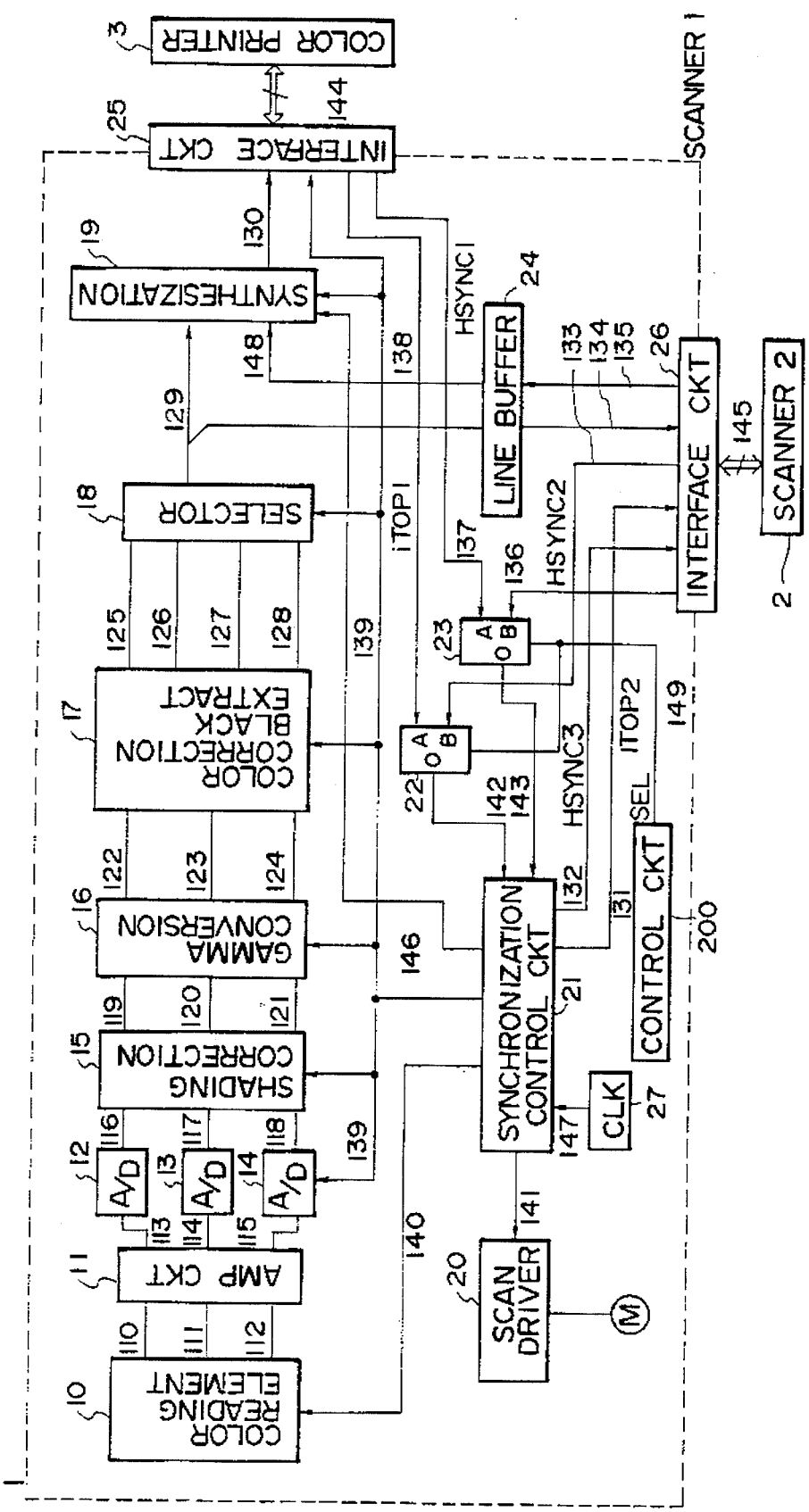
FIG. 1 is a block diagram showing a construction of the main section in the first embodiment of the present invention.
Figure 5:
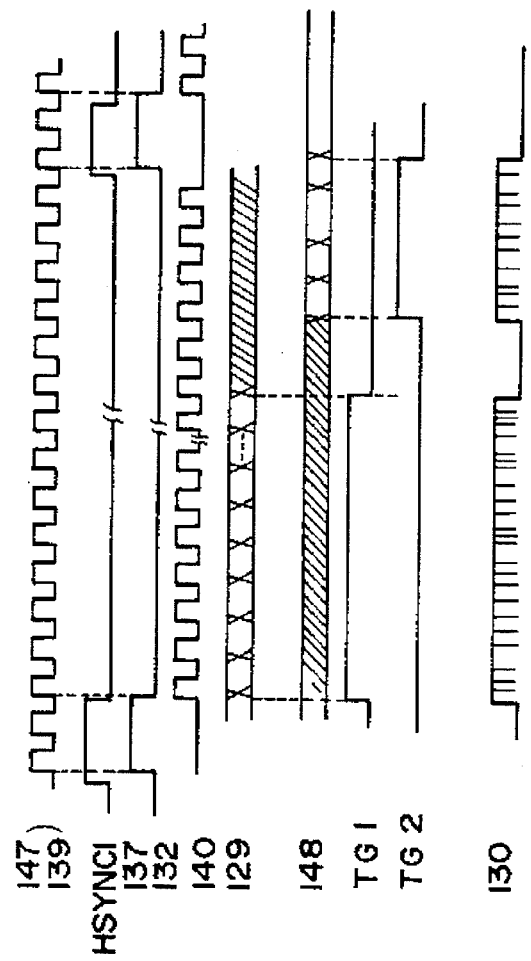
FIGS. 5 and 6 are time charts showing the operation of FIG. 1.
Figure 6:
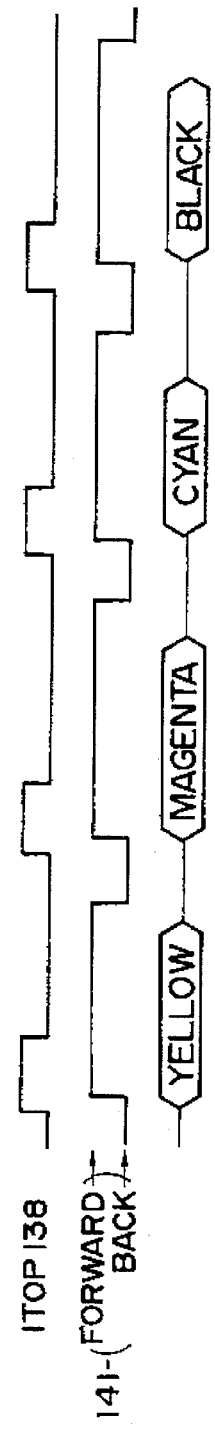

FIG. 1 is a diagram showing the details of an internal block of a color image processing system according to the invention. In FIG. 1, reference numeral 10 denotes a color reading element for color separating and reading color originals put on original base plates as shown at A and A' in FIG. 3 for every color component. For instance, the color reading element 10 uses a color CCD or the like having a color filter. The color reading element has a line shape and relates to what is called a flat bed type original reading apparatus in which an original is scanned by moving the color reading element for relative to the original. The color image read every line is converted into electric signals 110, 111, and 112 of, for instance, color components of R, G, and B and amplified to predetermined levels by an amplifier circuit 11. Thereafter, the signals of each color are converted into every color digital values every color by A/D converters 12 to 14. Then, variation of a light source (not shown) upon reading of the original, distortion of a lens system, variation in sensitivity of CCD sensors, and the like are corrected for, and the shading correction to provide the uniform image data is executed with respect to the whole area of one line. Digital image data 119, 120, and 121 of every color which have been shading corrected are converted from the R (red), G (green), and B (blue) signals into the Y (yellow), M (magenta), and C (cyan) signals of the subtractive color system by a gamma conversion circuit 16. In this embodiment, the gamma characteristic also provides for the LOG conversion, that is, the conversion characteristic from RGB to YMC. The color image data is produced to send it to the color printer as an output apparatus. It is known that the color separating filters which are used for the color CCD sensors do not have the ideal color separation characteristic. On the other hand, it is necessary to execute color correction among the colors due to various factors such as variation in characteristic of the light source, variation in sensitivity of the CCD sensors, and the like. In addition, the color toner or color ink used to print absorbs unnecessary components for ideal color absorbing characteristic. Therefore, color correction is executed by a color correction black extraction circuit 17. Such a color correcting process is ordinarily called color masking and is linear correction among color components or correction by a quadratic function. However, since such correction is well known, its detailed description is omitted here. Further, the black component signal for the black toner is calculated from the Y, M, and C (yellow, magenta, cyan) signals. Since such a calculation is also a well-known method, its description is omitted. Among yellow, magenta, cyan, and black signals 125 to 128 obtained after the color correcting and black extracting processes were executed, only a desired color signal is selected by a selector 18 in order to area sequentially color print every color. A horizontal sync signal (sync signal in the main scanning direction) HSYNC1 137 to send a color image to the color printer is transmitted once from the color printer 3 every image formation of one line on the printer side and is selected by a selector 23 and is input to a synchronization control circuit 21. All of the color image reading operations of the system in the main scanning direction are controlled synchronously with the HSYNC1. For instance, as shown in a timing chart of FIG. 5, the timing of the HSYNC1 which is transmitted from the color printer 3 is corrected in the synchronization control circuit so as to be synchronized with an internal clock (CLK) 147 which is generated from an internal clock (CLK) generator 27, so that a horizontal sync signal HSYNC3 132 is produced. The HSYNC3, the internal CLK 147, an image clock 139 in the scanner 1, and a drive pulse 140 of the color CCD sensor are completely synchronized. The image reading operation and internal processing operation are synchronized with the HSYNC1 and HSYNC3. On the other hand, as shown in FIG. 6, a sync signal ITOP1 138 in the subscanning direction which is transmitted from the color printer 3 is transmitted four times in the four-color printing mode. In response to the ITOP signal at the first time, a drive signal 141 indicative of a reading start command is transmitted from the synchronization control circuit 21 to a scan driver 20 of a scanning motor synchronously with the ITOP1 138 in order to read the yellow component (B component) of the original.

Figure 4:
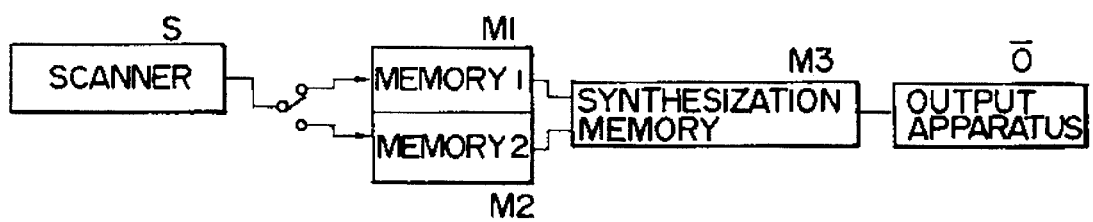
FIG. 4 is a block diagram showing a conventional construction.

In a manner similar to the above, in response to the ITOP signal at the second time, the drive signal 141 synchronized with the ITOP1 138 is transmitted to scan the magenta component (G component); for the cyan component (R component) in response to the ITOP signal at the third time; and for the black component in response to the ITOP signal at the fourth time. This manner of transmission will hereinafter be called "plane sequential", and a signal for a frame, transmitted in this manner, will be called a "plane sequential color signal". As already mentioned above, the scanner 1 is not necessarily connected to the color printer 3. That is, since the scanner 2 also has the internal structure shown in FIG. 1 in a manner similar to the scanner 1, when the printer 3 is connected to the scanner 2, in the scanner 1, the B input is selected by the selectors 22 and 23 and the sync signal to read the image is supplied from the scanner 2. On the other hand, in the scanner 2 (which has the same block diagram as that shown in FIG. 4; therefore, the same functions are designated by the same reference numerals), the selectors 22 and 23 select the A input and the sync signal supplied from the color printer 3. Further, the sync signal HSYNC3 132 and an ITOP2 131 for inputting an image from the scanner 1 are transmitted from the synchronization control circuit 21 in the scanner 2 to the scanner 1, thereby enabling the same functions as those mentioned above to be executed. A switching signal SEL 149 of the selectors 22 and 23 may be input from a control circuit 200 or may be directly set by a switch or the like which is manually operated.

As mentioned above, according to the embodiment, when a plurality of image reading apparatuses, that is, the scanners 1 and 2 are driven synchronously with the single printer 2, the sync signal from the printer 3 is once sent to the scanner 1 and the sync signal is transmitted from the scanner 1 to the scanner 2.

Therefore, as compared with the case of individually transmitting the sync signals from the printer 3 to the scanners 1 and 2, respectively, the following advantages are obtained.

(1) There is no need to independently output the sync signals from the printer 3 to a plurality of scanners and it is sufficient to merely output the sync signal from the printer 3 to the scanner 1, so that the construction of the printer 3 can be simplified.

(2) Since the sync signal which is generated from the printer 3 is commonly used for two scanners, for instance, in the case of synthesizing images from the two scanners, the accuracy can be improved.

Figure 7A:
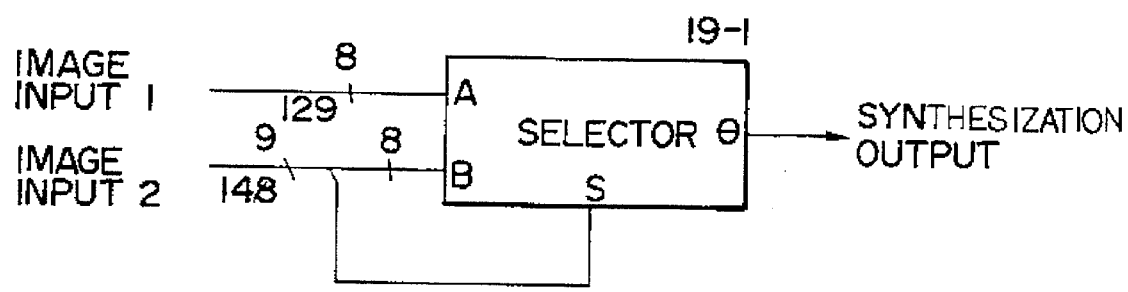
FIGS. 7A to 7C are diagrams showing a construction of a synthesization circuit 19 shown in FIG. 1 and a bit allocation of image data of an image input 2.
Figure 7B:
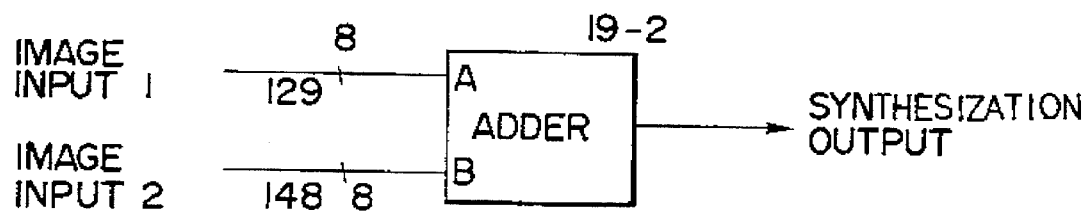
Figure 7C:
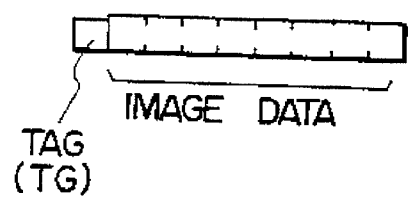
Figure 8A:
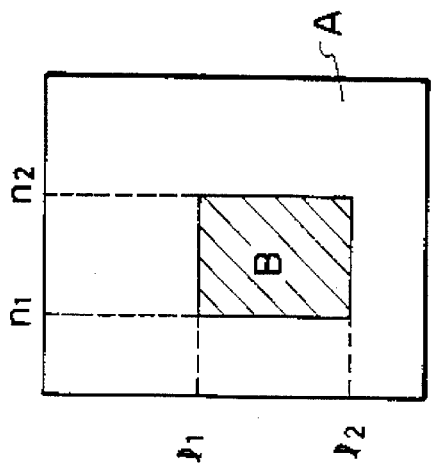
FIGS. 8A to 8C are diagrams for explaining the operation and construction of a synchronization control circuit 21 shown in FIG. 1.
Figure 8B:
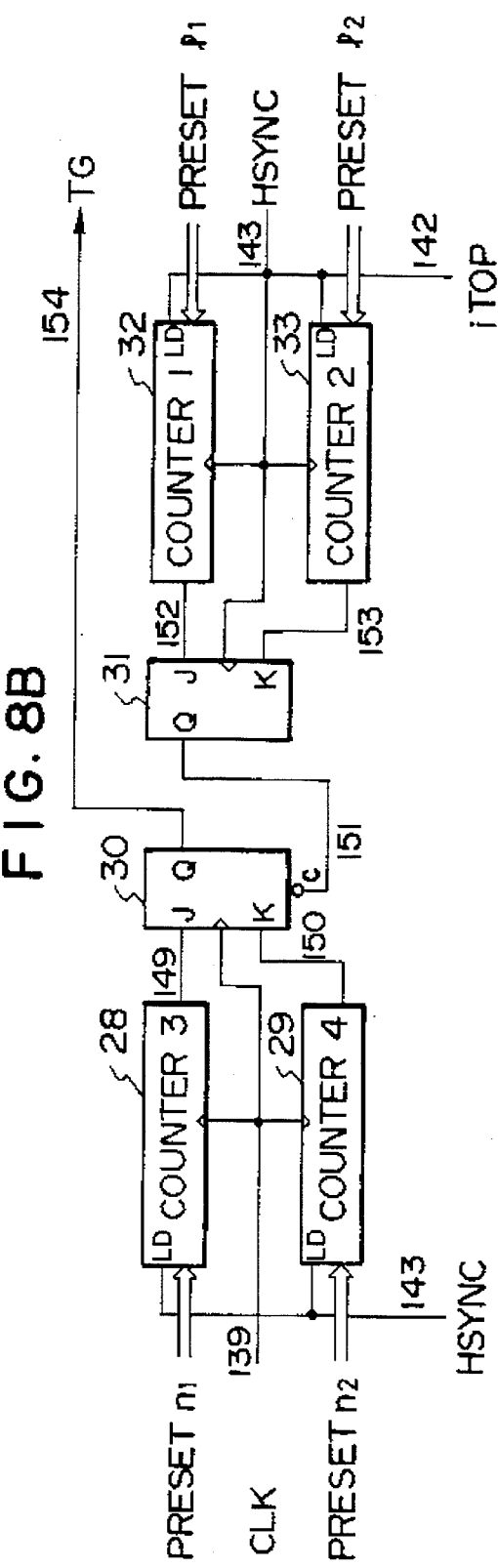
Figure 8C:
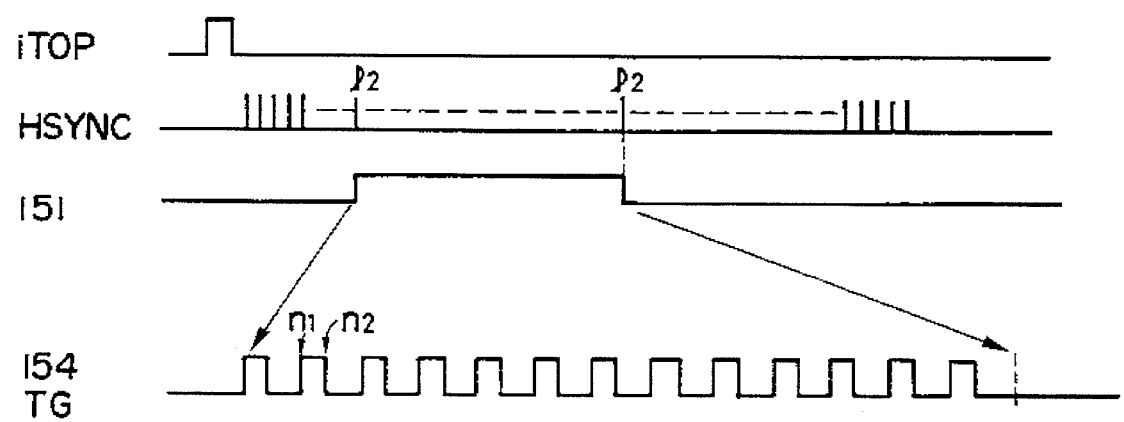

FIG. 7 shows a construction of a synthesization circuit 19 shown in FIG. 1. FIG. 7A relates to an example in which the synthesization circuit 19 is realized by a switching circuit and FIG. 7B relates to an example in which it is realized by an adding circuit. In FIG. 7A, a tag of one bit indicative of an effective image for synthesization is added to image data as shown in FIG. 7C and the switching for the selector is made by the added tag bit. A tag bit TG is produced in, for instance, the synchronization control circuit 21 as shown in FIG. 8C by a circuit shown in FIG. 8B. For instance, as shown in FIG. 8A, in the case where a hatched portion B in a whole area A is read by the scanner 2 and synthesized with an image read by the scanner 1, when it is assumed that the B region exists in a range from the n1th pixel to the n2th pixel in the main scanning direction and from the $l_1$th line to the $l_2$th line in the subscanning direction, a signal TG 154 which is set to "1" in a real time manner for only the desired B region is produced by counters 3 and 4 indicated by reference numerals 28 and 29 for counting the pixel clocks 139 and by counters 1 and 2 shown by reference numerals 32 and 33 for counting the number of lines synchronously with the HSYNC in FIG. 8B. That is, count values $l_1$ and $l_2$ are loaded into the counters 1 and 2 by an ITOP 142 also serving as a drive pulse in the subscanning direction. The counters 1 to 4 are down counters which generate output signals 152, 153, 149, and 150 when the count values are set to "0". The counting operation is started by an HSYNC 143. When the counter has counted the $l_1$ line, a J/K flip-flop 31 is set and a signal 151 is set to "1". The signal 151 is held to the "1" level until the count value=0 of the counter 2, therefore, the $l_2$ line. The signal 151 is input to a clear terminal C of the J/K flip-flop 30 to produce the tag bit TG. The signal 151 is controlled such that TG="0" in the regions other than the region from $l_1$ to $l_2$. The above operations are shown in FIG. 8C. That is, when the signal 151="1", therefore, in the range from $l_1$ and $l_2$ shown in FIGS. 8B and 8C, an interval signal to keep the signal 151 to the "1" level is formed every main scan for the interval from the n1th pixel to the n2th pixel. The signal like TG 154 in FIG. 8C is generated. Since the operations of the counters 28 and 29 are substantially the same as those of the counters 32 and 33, their descriptions are omitted. The signal TG produced as mentioned above is added as the tag bit for switching shown in FIG. 7A to the image data and is transmitted. As mentioned above, for the signals $TG_1$ and $TG_2$ in FIG. 5, the tag bit added by the scanner 1 is shown by $TG_1$ and the tag bit added by the scanner 2 is shown by $TG_2$.

The tag bit $TG_2$ added by the scanner 2 is input to a selector 19-1 in the synthesization circuit 19 in the scanner 1. Further, the tag bit $TG_1$ is output as a signal 146 to the synthesization circuit 19 synchronously with the image data which is output from the selector 18. In the synthesization circuit 19, if another selector or a gate is arranged between the selector 19-1 shown in FIG. 7A and the selector 18 and such a selector inputs the tag bit $TG_1$ to the gate, the synthesization shown in the timing chart of FIG. 5 can be easily realized.

Figure 2:
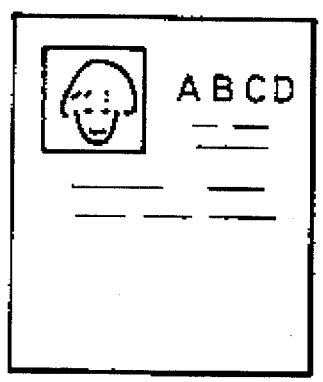
FIG. 2 is a diagram showing an example of synthesis of images.
Figure 2:
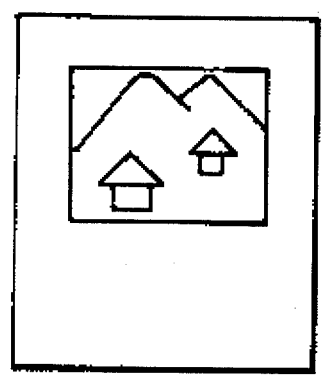
Figure 2:
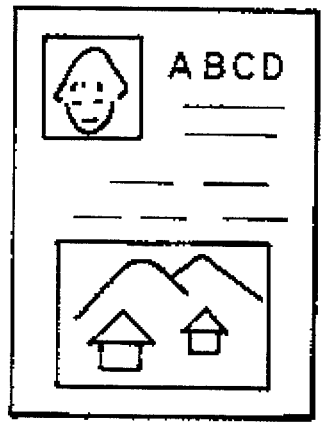

In FIG. 7A mentioned above, the synthesization has been executed by switching the image inputs 1 and 2. However, if the synthesization circuit is constructed by an adder as shown in FIG. 7B, such a construction is suitable to synthesize images and design characters as shown in FIG. 2.

[Embodiment 2]

FIG. 9 shows another embodiment. For instance, as shown in the diagram, a mountain image is stored in a memory 1 35 and a house image is likewise stored in a memory 2 36. The memory 1 is, for instance, a memory plane of eight bits and can store images of 256 gradations. On the other hand, the memory 2 is a memory having a depth of nine bits (that is, eight bits + one bit), in which the image is expressed by eight bits =256 gradations and a remaining one bit 157 is used as a tag for synthesization. "1" is written into a one-bit memory plane for the tag in the memory 2, for instance, into a desired synthesization area (that is, an area shown by a hatched portion in the diagram in the embodiment) by the CPU 201 through a selector 40. The area designated by a digitizer 300 shown by a broken line is read by the CPU 201. "1" is written into the area on the one-bit memory plane for the tag in the memory 2 corresponding to the designated area. In this manner, the above writing operation of "1" is executed. When an image signal is output to a printer 37, the selector 40 selects a control signal 159 from a memory control circuit 39 and the image data are simultaneously read out of the memories 1 and 2. The mountain image is read out of the memory 1 and the house image is read out of the memory 2. A selector 38 is a switching circuit to select an input 156 when a selection input S is at the "1" level and to select an input 155 when the selection input S is at the "0" level. In the embodiment, the selector 38 selects the input 156 in correspondence to only the hatched portion in the diagram. Thus, as an input 158 of the printer 37, non-rectangular accurate image synthesization as shown in FIG. 10 can be realized.

[Embodiment 3]

Figure 11:
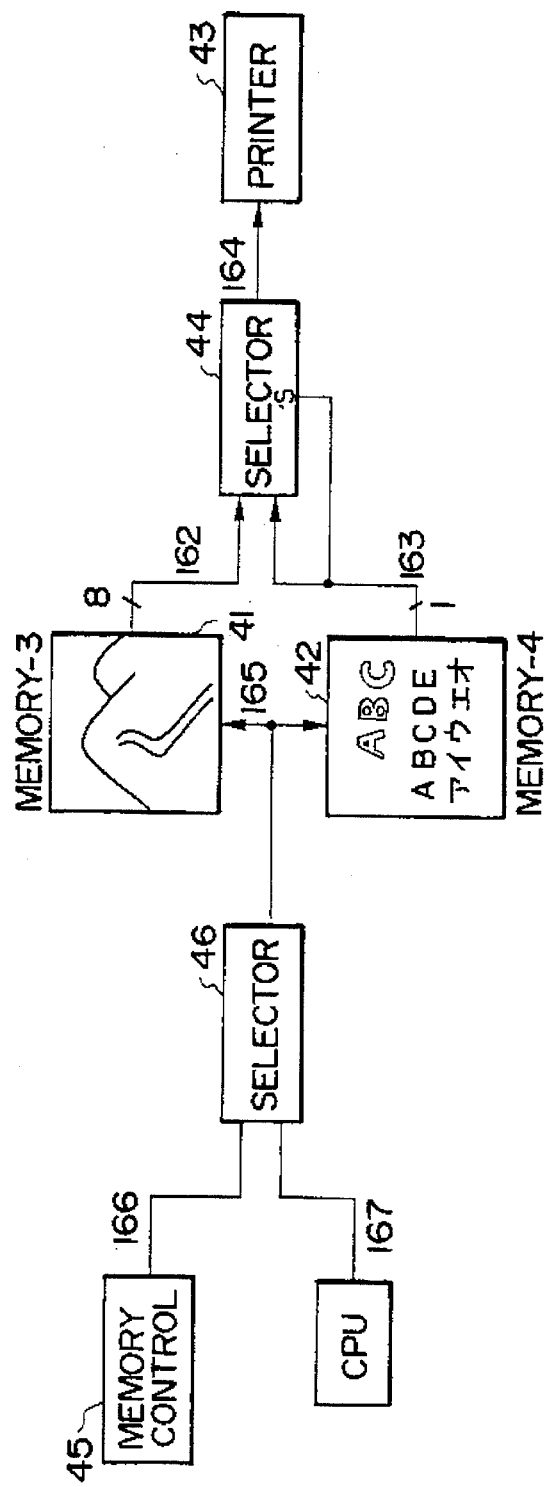
FIG. 11 is a block diagram showing a construction of the third embodiment of the invention.
Figure 12:
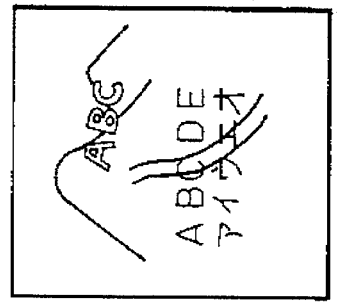
FIG. 12 is a diagram showing an image synthesized by a system shown in FIG. 11.

FIGS. 11 and 12 show still another embodiment. Although a fundamental construction is similar to that in FIG. 9, a memory 3 41 is used to store images of eight bits=256 gradations and a memory 4 42 is a one-bit memory to store characters. A selector 44 is a switching circuit to select an input 163 when a switching input S is at the "1" level and to select an input 162 when the switching input S is at the "0" level. "1" is written into an area in the memory 4 corresponding to the character through a CPU bus 167. An image as shown in the diagram has previously been stored in the memory 3. When an output (FIG. 12) of the synthesized image of the images read out of the memories 3 and 4 is obtained from a printer 43, a control signal 166 from a memory control circuit 45 is selected by a selector 46. The contents in the memories 3 and 4 are simultaneously read out synchronously. "1" is read out of the memory 4 in correspondence to the character position. "0" is read out of the memory 4 in correspondence to the portion having no character. Therefore, the selector 44 selects the character signal 163 in correspondence to the character position and selects the half tone image signal 162 in correspondence to the positions other than the character position. Thus, character synthesization as shown in FIG. 12 can be realized.
(Embodiment 4)

In the above embodiment, as shown in FIG. 9, the bit map for the tag has been provided together with the memory 2 having a depth of eight bits. An embodiment in which such a construction is further simplified will now be described hereinbelow with reference to FIG. 13.

Figure 13:
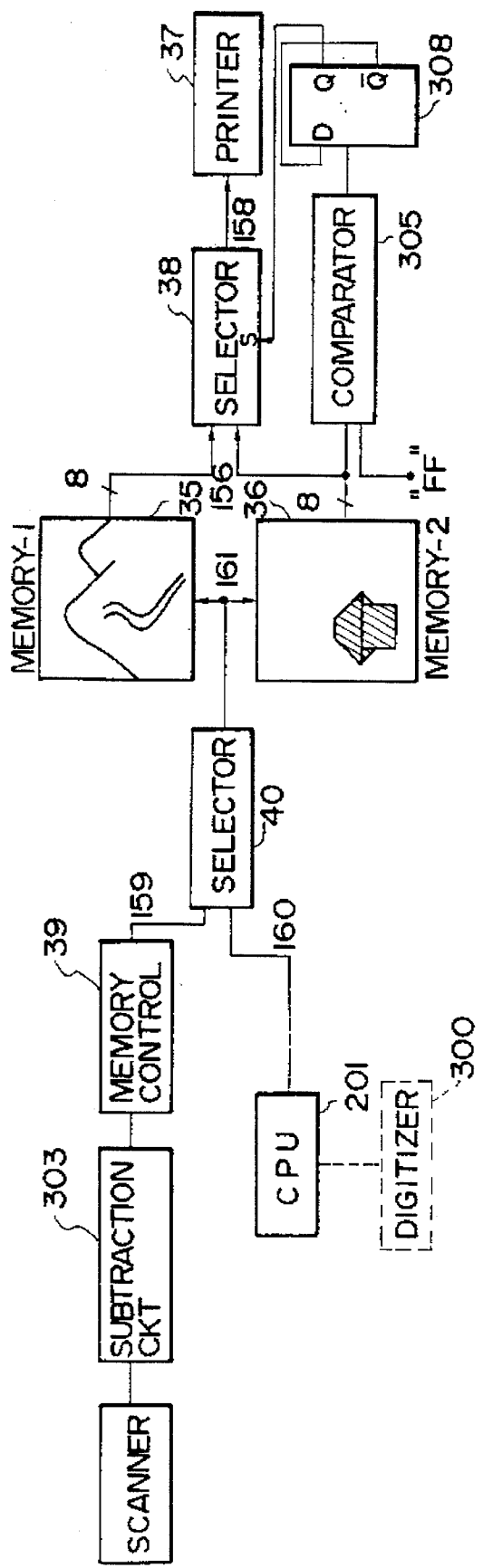
FIG. 13 is a block diagram showing a construction of another embodiment of the invention.

In the embodiment of FIG. 13, in the case where a special value in data indicative of an image to be written into the memory 2, for instance, a depth of each pixel in the memory 2 is expressed by eight bits, for instance, the data of "FF" of the maximum value is used as a tag for the image synthesization.

Therefore, in the construction shown in FIG. 13, there is provided a subtraction circuit 303 to subtract "1" from data which is written into the memory 2, for instance, data from an input apparatus such as the scanner 1 whose construction is shown in FIG. 1. Therefore, when the data from the input apparatus is "FF", "1" is subtracted from the "FF" data, so that "FE" is obtained. In this manner, the data is set so as not to have the same value as the data "FF" which is used as a tag. Thus, although the input image data is constructed by 255 gradations which are expressed by eight bits, a problem substantially hardly occurs.

Figure 14:
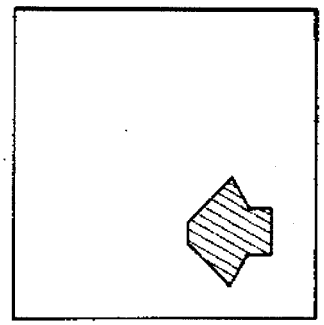
FIG. 14 is a diagram showing an area in a memory 2 shown in FIG. 13 into which "FF" is written by a CPU 201, the area being indicated by a solid line.

The tag, i.e., the "FF" data is written into the memory 2 by the CPU 201 with respect to the portion in the memory 2 corresponding to the outline of the area designated by the digitizer 300, that is, the portion shown by a solid line in FIG. 14.

In such a case, the selector 40 is switched to the side of a CPU 160.

In FIG. 13, reference numeral 305 denotes a comparator for comparing the image data read out of the memory 2 with the set "FF" data and for setting its output to the "H" level when they coincide. Reference numeral 308 denotes a D flip-flop (D-FF) which inverts an output Q when the output level of the comparator 305 rises from "L" to "H". At the start of the reading operation of the memory 2, the D-FF 308 is reset.

Figure 15:
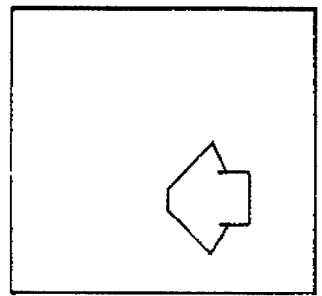
FIG. 15 is a diagram showing a period of time when an output of a D-FF 308 shown in FIG. 13 is set to the high level.

Therefore, the period of time when the output of the D-FF 308 is at the "H" level for the image in which "FF" is written in the portion indicated by a solid line shown in FIG. 14 corresponds to the period of time shown by the hatched portion in FIG. 15. For such a period of time, the image output from the memory 2 is selected by the selector 38.

In the embodiment, by using such a construction, there is no need to particularly prepare a one-bit memory plane for the tag and the construction can be simplified.

In the embodiment shown in FIG. 13, "FF" has been used as a bit indicative of the tag. However, the invention is not limited to such a method. For instance, in the case of using other data such as "00", an adder is used in place of the subtraction circuit 303 and "01" is added to the input image data. Data which is written into the memory 2 by the CPU 201 is set to "00" and "00" is supplied as one input to the comparator 305.

FIG. 17 shows an external view of the digitizer shown in FIGS. 13 and 9. The digitizer shown in FIG. 17 comprises: a coordinates detecting plate 420, a point pen 421, an indication key 427 for inlay synthesization to indicate to synthesize two images, and an indication key 424 to indicate to designate a desired area.

In the above embodiment, when two image signals from two image reading apparatuses are synthesized or when two image signals read out of two image memories are synthesized, the foregoing tag bit or the data corresponding to the tag has been output as the image data. However, the synthesization using such a "tag" can be also applied to the synthesization of the image signal read out of the memory and the image signal from the image reading apparatus without limiting to the foregoing example.

Such an application example will now be described with reference to FIG. 16.

Figure 16:
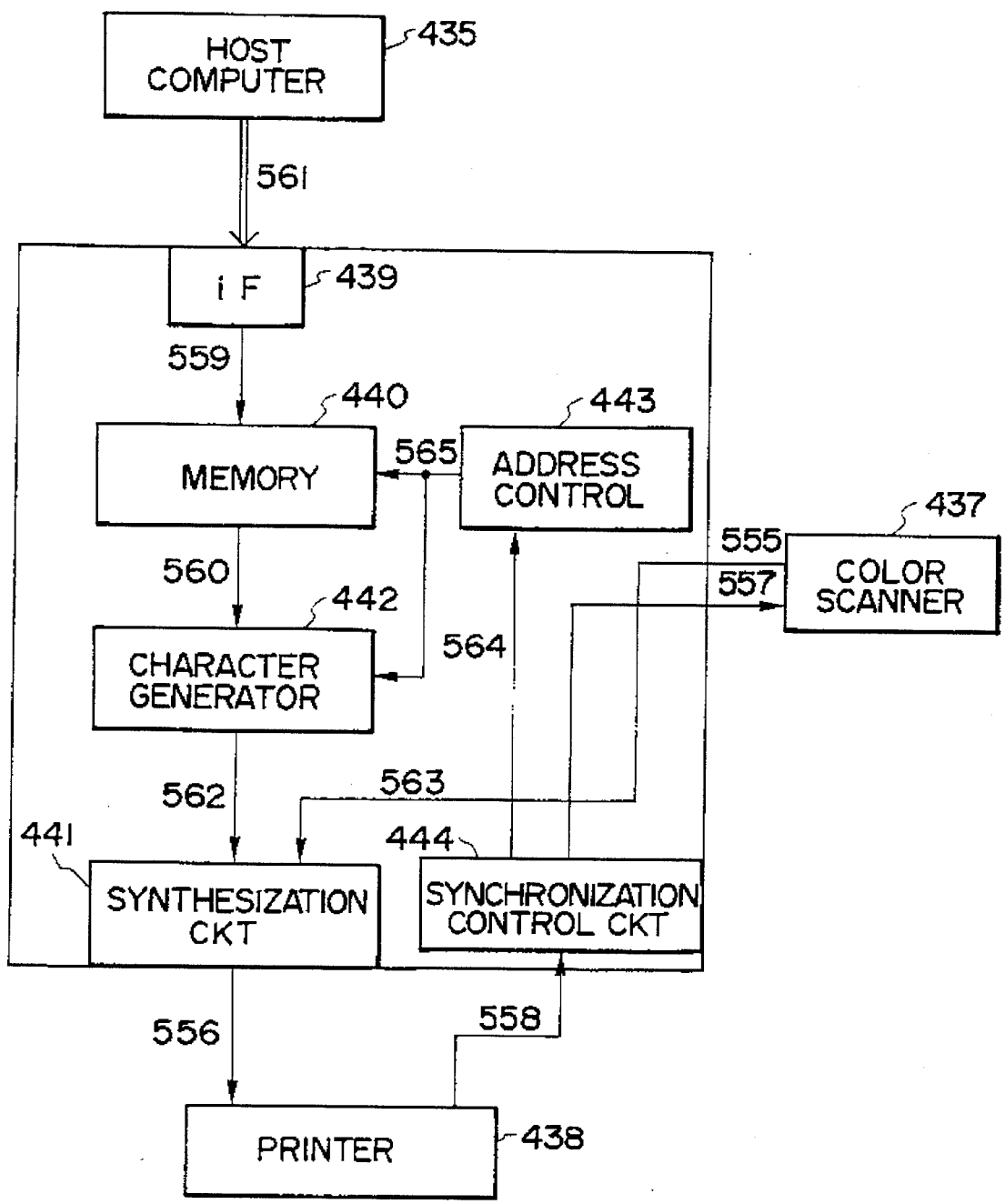
FIG. 16 is a block diagram showing a construction of still another embodiment of the invention.

FIG. 16 shows an example in which the character image formed by an information processing system such as a host computer 435 or the like and a very fine image from a color scanner 437 are synthesized.

A predetermined character code image is stored from the host computer 435 into a memory 440 for storage of images through a general interface bus 561. Upon synthesization output, a sync signal 558 is received from a printer 438 and a sync signal 564 to read out data from the memory 440 and a sync signal 557 to read out a color image are produced by a synchronization control circuit 444. Character code information 560 is read out of the memory 440 on the basis of a read address which is generated from an address control circuit 443 which is activated by the sync signal 564. A signal 562 which was developed into dot information by a character generator 442 is input to a synthesization circuit 441. On the other hand, the sync signal 557 to read out the color image is input to the color scanner 437. In order to synchronize with the character image which is read out of the memory 440 a color image 555 is input to the synthesization circuit 441 synchronously with the sync signal 557 produced and is synthesized with the character image which has been dot developed.

The synthesization circuit 441 includes the selector 44 as shown in FIG. 11 and can synthesize two images by constructing such that the signal from the character generator 442 is supplied to the selector 44.

On the other hand, in the embodiment, the invention is not limited to the synthesization of a multivalue image of a complicated image and a binary image of characters or the like as shown in FIG. 11 but can be also applied to the synthesization of a multivalue image and a multivalue image as shown in FIG. 9.

A scanner section can be also provided only for use of each memory.

As mentioned above, according to the embodiment, an image of a complicated shape, characters, or the like can be accurately realized by a simple hardware construction. Therefore, image information and character information are synthesized and variable compound image information in a wide range can be provided.

On the other hand, particularly, according to the embodiment shown in FIG. 3, image signals from two image reading apparatuses can be synthesized by the simple construction.

We claim:

1. A color image processing system comprising:
   a) a first reading apparatus for converting a first object color image into a first color image signal which is a plane-sequential color signal;
   b) a second reading apparatus for converting a second object color image into a second color image signal which is a plane-sequential color signal; and
   c) synthesizing means for synthesizing said first and second color image signals,
      wherein said synthesizing means synthesizes respective color components of the first color image signal output from said first reading apparatus with respective corresponding color components of the second color image signal output from said second reading apparatus; and
   d) control means for controlling said first reading apparatus and said second reading apparatus based on a synchronizing signal for each color of said plane-sequential color signal of said first reading apparatus or of said second reading apparatus.

2. A system according to claim 1, wherein said first reading apparatus is a flat bed type reading apparatus.

3. A system according to claim 1, wherein said second reading apparatus is a flat bed type reading apparatus.

4. A system according to claim 1, wherein said synthesizing means synthesizes said first color image signal into a special area of said second color image signal.

5. A system according to claim 4, wherein said synthesizing means inlay synthesizes said first color image signal into a special area of said second color image signal.

6. A system according to claim 4, further comprising:
   designating means for designating said special area.

7. A color image processing system comprising:
   a) an image forming device for forming a given image signal as a visible image, said image forming device outputting a sync signal for image formation from said image forming device;
   b) a first reading device for converting an object image into an image signal synchronously with the sync signal which is output from said image forming device; and
   c) a second reading device for converting an object image into an image signal synchronously with a second sync signal,
      wherein said first reading device supplies the second sync signal to said second reading device in response to the sync signal which is output from said image forming device.

8. A system according to claim 7, wherein said first reading device is a device for converting an object color image into a color image signal.

9. A system according to claim 7, wherein said second reading device is a device for converting an object color image into a color image signal.

10. A system according to claim 7, further comprising synthesizing means for synthesizing the image signal converted by said first reading device and the image signal converted by said second reading device.

11. A system according to claim 10, wherein said image forming device forms the image signal synthesized by said synthesizing means as a visible image.

12. A system according to claim 7, wherein said image forming device is a color laser printer.

13. A system according to claim 12, wherein said sync signal from said image forming device is a horizontal sync signal of the color laser printer.

14. A color image processing system comprising:
   a) a first image signal generating device for generating a first image signal;
   b) a second image signal generating device for generating a second image signal, said second image signal generating device generating image effective area information parallelly with the second image signal; and
   c) synthesizing means for synthesizing outputs of said first and second image signal generating devices in response to the image effective area information,
      wherein the image effective area information is a specified bit of the second image signal.

15. A system according to claim 14, wherein the said image effective area information is a signal of one bit which is added to the image signal.

16. A system according to claim 14, wherein said second image signal generating device generates an image signal of one bit and said synthesizing means executes the synthesization on the basis of the one-bit image signal.

17. A system according claim 14, further comprising image forming means for reproducing an output synthesized by said synthesizing means as a visible image.

18. A system according to claim 14, wherein said synthesizing means is means for synthesizing outputs of said first and second image signal generating devices.

* * * * *

UNITED STATES PATENT AND TRADEMARK OFFICE
CERTIFICATE OF CORRECTION

PATENT NO. : 5,585,945

DATED : December 17, 1996

INVENTORS : YOSHINORI IKEDA ET AL.

It is certified that error appears in the above-identified patent and that said Letters Patent is hereby corrected as shown below:

COLUMN 3

Line 55,    "for" should be deleted;
   Line 60,    "every color digital values every color" should read --digital values--.

COLUMN 4

Line 62,    "This" should read --(This--;
   Line 65,    "signal"." should read --signal".)--.

Signed and Sealed this

Sixth Day of May, 1997

Attest:

BRUCE LEHMAN

*Attesting Officer*     *Commissioner of Patents and Trademarks*